(12) United States Patent
Catalfamo et al.

(10) Patent No.: US 7,727,946 B2
(45) Date of Patent: Jun. 1, 2010

(54) PROCESS FOR MAKING FUNCTIONALIZED FILMS FOR CLEANING PRODUCTS

(75) Inventors: Vincenzo Catalfamo, Cincinnati, OH (US); Frank William Denome, Cincinnati, OH (US); Dennis Allen Beckholt, Fairfield, OH (US); Yousef Georges Aouad, Cincinnati, OH (US); James Michael Archbold, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 770 days.

(21) Appl. No.: 11/432,246

(22) Filed: May 11, 2006

(65) Prior Publication Data

US 2006/0257596 A1    Nov. 16, 2006

Related U.S. Application Data

(60) Provisional application No. 60/681,078, filed on May 13, 2005.

(51) Int. Cl.
  *C11D 17/04* (2006.01)
(52) U.S. Cl. .................. 510/296; 510/438; 510/439
(58) Field of Classification Search .................. 510/108, 510/130, 235, 296, 438, 439
  See application file for complete search history.

(56) References Cited

U.S. PATENT DOCUMENTS

| | | | |
|---|---|---|---|
| 4,532,063 A * | 7/1985 | Gueldenzopf .......... 252/186.35 |
| 5,133,892 A | 7/1992 | Chun et al. |
| 5,362,532 A | 11/1994 | Famili et al. |
| 5,429,874 A | 7/1995 | Vanputte et al. |
| 5,439,745 A | 8/1995 | Ohba et al. |
| 5,494,731 A * | 2/1996 | Fereshtehkhou et al. . 428/211.1 |
| 6,465,407 B2 * | 10/2002 | Hayashi et al. ............. 510/295 |
| 6,699,826 B1 * | 3/2004 | Saijo et al. .................. 510/296 |
| 7,125,828 B2 | 10/2006 | Catlin et al. |
| 2004/0253434 A1 | 12/2004 | Patel et al. |
| 2006/0159729 A1 * | 7/2006 | Helfman et al. ............. 424/443 |

FOREIGN PATENT DOCUMENTS

| | | |
|---|---|---|
| EP | 0 479 404 A2 | 4/1992 |
| EP | 1 275 368 A1 | 1/2003 |
| WO | WO 01/23460 A1 | 4/2001 |
| WO | WO 03/076513 A | 9/2003 |

* cited by examiner

*Primary Examiner*—Lorna M Douyon
(74) *Attorney, Agent, or Firm*—Julie A. McConihay; Laura R. Grunzinger; Leonard W. Lewis

(57) ABSTRACT

Process for making a functionalized substrate in the form of a water-soluble film carrying a coating of a functional composition, the process comprising applying to at least one side of the film an aqueous solution comprising one or more functional materials to form the coating wherein the coating is formed from a plurality of layers in a stepwise manner and/or the aqueous solution comprises a film insolubilizer agent.

6 Claims, No Drawings

PROCESS FOR MAKING FUNCTIONALIZED FILMS FOR CLEANING PRODUCTS

CROSS REFERENCE TO RELATED APPLICATION

This application claims priority to U.S. Provisional Application Ser. No. 60/681,078 filed May 13, 2005, the disclosure of which is incorporated by reference.

TECHNICAL FIELD

The present invention relates to a process for making functionalized substrates, in particular functionalized substrates in the form of a water-soluble film carrying a coating of a functional composition. The invention also relates to functionalized substrates and their use in cleaning products.

BACKGROUND OF THE INVENTION

In the world of multi-ingredients products, in particular cleaning products, the formulator is faced with a series of challenges including incompatibility among different ingredients, the need of delivering ingredients in pre-determined amounts, the sequential release of different ingredients, etc.

Some of these challenges have been tackled before, however, the design of a product overcoming the above issues usually involve cumbersome processes and complex products. For example, the literature presents various solutions to the problem of ingredient incompatibility and sequential release. U.S. Pat. No. 5,133,892 discloses a multilayer detergent tablet containing an outer layer, a barrier layer and an inner layer. The tablet sequentially releases ingredients contained in the outer layer and ingredients contained in the inner layer. The time interval between the release of the outer layer ingredients and the release of the inner layer ingredients is controlled by the particular choice of an ingredient for the barrier layer and the relative thicknesses of the inner layer, the barrier layer and the outer layer. The tablet is able to separate in time the dissolution of incompatible ingredients such as enzymes and chlorine bleach. The tablet also provides sequential release of a dishwashing composition and a rinse aid composition such that cleaning is accomplished prior to the release of the rinse aid. This multilayer tablet not only requires a complex manufacturing process but also the use of a high number of non-active ingredients, ie, ingredients that do not contribute to the cleaning process such as those used in the barrier layer.

Cleaning products in the form of water-soluble pouches, sachets and capsules are becoming more widely available. Ingredient separation can also be achieved by means of multi-compartment pouches such as those described in WO 02/42,401. '401 describes dual compartment pouches comprising different compositions in different compartments.

The modification of water-soluble films to improve their handling properties is known in the literature. EP 479,404 relates to a composite packaging film comprising a continuous water-soluble base film carrying on one or both surfaces a discontinuous, at least partially non-particulate layer of a second plastics material which is less water-soluble than the base film material, for example, nitrocellulose. The composite film is produced by applying the second material from a non-aqueous solution onto the base film to form a discontinuous pattern. The discontinuous layer may be applied by printing.

WO 01/23,460 relates to a water-soluble film having a water-insoluble material present on a surface thereof, wherein the water-insoluble material is used in an amount of 0.1 to 80% by weight of the film and is in the form of particles having an average particle diameter of less than 500 µm or fibres having a length of 10 µm to 6 mm. The film has high storage stability and good feel to the touch. The water-insoluble material may be fixed to the water-soluble film by a binder. The water-insoluble material and the binder are delivered to the water-soluble material dispersed or dissolved in an organic solvent.

WO 03/031637 discloses a method of manufacturing reversible flexible substrates with actives embedded/entrapped therein. The amount of actives that can be embedded/entrapped into the film is limited by the film dimensions. It seems that high levels of active cannot be achieved with '637's method.

EP 1,275,368 relates to a perfume containing composition suitable for adding a low level of perfume to water-soluble films. The composition requires a silicone-base surfactant.

There remains the need of a method to load high level of actives onto water-soluble films without altering the properties of the film.

SUMMARY OF THE INVENTION

According to a first aspect of the invention, there is provided a process for making a substrate in the form of a water-soluble film carrying a coating of a functional composition. By "functional composition" is herein meant a composition which comprises one or more materials that perform a function or deliver a benefit after dissolution of the film or which modify the physical or chemical properties of the film, other than aesthetic appearance. For example inks, decorative dyes and pigments are not considered functional materials.

The process of the invention is suitable for loading high levels of one or more functional materials, especially for levels higher than those achieved by processes in which the functional material is embossed or embedded in the film. Preferably the coating is in a level of at least about 5, more preferably at least about 10, even more preferably at least about 50 and especially at least about 100 g/m$^2$. Preferably the loading is at least about 30%, more preferably at least about 50%, even more preferably at least about 100% and especially at least about 200% by weight of the uncoated film. Preferably, the coating comprises the one or more functional materials in a level of at least about 30%, more preferably at least about 60% and especially at least about 70% by weight of the coating.

Substrates obtained according to the process of the invention are a very efficient way of delivering high levels of functional materials in water because the thickness of the film does not limit the amount of materials that can be loaded. The films can be loaded with a wide variety of functional materials, including flavours, plant food, softening agents, crisping agents, water/stain repellents, refreshing agents, anti-static agents, anti-microbial agents, disinfecting agents, wrinkle resistant agents, wrinkle release agents, odour resistance agents, malodor control agents, abrasion resistance agents, solvents, insect/pet repellents, wetting agents, UV protection agents, skin/fabric conditioning agents, skin/fabric nurturing agents, colour protection agents, silicone, preservatives, fabric shrinkage-reducing agents and combinations thereof.

The process comprises the step of applying to at least one side of the water-soluble film an aqueous solution comprising one or more functional material(s) to form the coating wherein the coating is formed from a plurality of layers in a stepwise manner and/or from a solution comprising a film insolubilizer agent.

By "aqueous solution" is herein meant a solution in which the solvent in major proportion is water. The solution can also comprise other solvents in minor proportions. Preferably, the water content of the solution is at least about 10%, preferably at least about 20%, more preferably at least about 30% and even more preferably at least about 40% by weight above the level of any other solvent present in the solution. Preferably, the water content of the solution is at least about 20%, more preferably at least about 30%, even more preferably at least about 40% and especially at least about 60% by weight. The term solution should be broadly interpreted for the purpose of this invention, including any mixture comprising water and functional material. Slurries and dispersions (liquid/solid), foams (liquid-gas) and emulsions (liquid/liquid) are considered to be solutions.

One of the advantages of the process of the invention is that it does not require the use of organic solvents which are expensive, difficult to handle and have environmental and safety risks associated with them. One of the challenges faced by a process using an aqueous solution to treat a water-soluble, i.e., water-sensitive, film is that the film is susceptible to water attack. The film could be degraded (i.e., formation of pin holes, shrinkage, deformation, formation of visible ribs, sagging, thinning-out, etc) and some of its initial properties would be lost even after a drying step performed as soon as possible after the film has been exposed to the aqueous solution. It has surprisingly been found that the process of the invention, even although uses an aqueous solution, does not substantially alter the properties of the water-soluble film and does not substantially change the water content of the water-soluble film with respect to the uncoated film.

Without being bound by theory, it is believed that the surface of the water-soluble film is partially dissolved by the aqueous solution. Once the water from the aqueous solution has been removed the surface of the film re-solidifies thereby adhering the functional material onto it. Thus, another advantage of the process of the invention is that the coating can be adhered or fixed to the film without the use of binders or other auxiliary agents. This reduces the cost and simplifies the process.

When the coating is formed from a plurality (i.e., two or more) of layers in a stepwise manner, the first layer, (i.e., the layer in direct contact with the film), is relatively thin or is dried at substantially the same time as the aqueous solution is placed on the film. In order to determine the thickness of the first layer and/or the rate of drying of this layer, trial and error could be used. The thickness, rate of drying and any other variables of the process should be such as to maintain the mechanical integrity of the film. This can be tested by measuring the elasticity of the film before and after the first layer has been formed. The elastic properties of the film (tensile strength, elongation modulus and percentage of elongation at break) should be within about 40%, preferably within about 20%, more preferably within about 10% of those of the uncoated film when measured under identical relative humidity and temperature conditions, for example at 40% relative humidity and 20° C., preferably the film is kept at these conditions for 24 hours before the measure is performed.

The use of a stepwise process allows partial or total drying to take place before the next layer is deposited thereby avoiding the exposure of the film to extremely high levels of water at once. Preferably there are no limitations on the amount of water that the aqueous solution can comprise. The first layer protects the water-soluble film from interactions with the successive layers. An additional benefit of applying multiple thin layers of the aqueous solution on the water-soluble film as opposed to large quantities altogether, is that the drying steps can be accomplished under mild drying conditions, i.e. short ovens, small air flows, lower temperatures, simpler method (e.g. hot air vs. IR) and hence more economically. Furthermore, mild drying conditions make the process suitable for heat sensitive ingredients such as enzymes, perfumes, bio-actives (e.g. proteins, catalysts and vitamins) etc.

The coating comprising the functional material(s) can be formed from a solution comprising a film insolubiliser, ie., an agent that temporarily reduces the solubility of the film in presence of the aqueous solution at the level at which is used in the process. However, the functionalized film remains soluble when immersed in water. The water-soluble film is less prone to water attack (still gets wet by the aqueous solution so the functional material(s) can be deposited but it does not get solubilized or does not absorb water in depth causing film swelling and alteration of physical properties). This allows using layers of greater thickness and consequently can decrease the number of layers needed. For certain applications it might be reduced to just one. The film insolubilizer can be applied before the aqueous solution comprising the functional material or as part of the aqueous solution.

The coating can be applied on the film by means of any coating process, including spray, knife, rod, kiss, slot, painting, printing and mixtures thereof. Printing is preferred for use herein. Printing is a well established and economic process. Printing is usually done with inks and dyes and used to impart patterns and colours to substrates but in the case of the invention printing is used to deposit the functional material(s) onto a water-soluble film. Any kind of printing can be used, including rotogravure, lithography, flexography, porous and screen printing, inkjet printing, letterpress, tampography and combinations thereof. Preferred for use herein is flexography printing. Flexography printing equipment is relatively cheap and run fast in comparison with other printing techniques. An advantage of flexography is the common multi-printing stations set-up so that multiple printing can be accomplished in one pass with ordinary equipment. Another advantage of flexographic printing is its flexibility to handle printing solutions of high viscosity and wider particle size range than ink jet printing. Flexography is a printing technology which uses flexible raised rubber or photopolymer plates to carry the printing solution to a given substrate. In the process of the invention the flexible plates carry the aqueous solution to the film. The fact that the solution is water based does not give rise to incompatibilities with the plate which can cause the plate to swell thereby impairing in the accuracy of the printing.

In preferred embodiments the process comprises the step of depositing a second film over the coating and sealing the two films to form a laminate. These embodiments are especially suitable when the coating comprises functional materials that should be protected from the surrounding environment due to incompatibility issues or that should be isolated in order to avoid the contact with the skin of the user. The second film can also comprise a coating of a functional composition. The number of films sealed together is determined by the application of the functionalized film.

In preferred embodiments the functional material(s) is/are selected from the group consisting of cleaning actives, barrier agents, solubility modifiers and mixtures thereof.

Cleaning actives are substances which play an active role in the cleaning process, including the finishing step, ie., the rinse. Cleaning actives include substances such as surfactants (anionic, nonionic, cationic and amphoteric surfactants), builders (inorganic and organic builder substances), bleaches, bleach activators, bleach stabilizers, bleach catalysts, enzymes, special polymers (for example those having cobuilder properties, soil re-deposition prevention, finishing properties), fragrances (perfumes), without the term being restricted to these substance groups. The preferred functional materials are cleaning actives. Preferably, the cleaning actives are present in the coating in a level of at least about 30%, more preferably at least about 50% and especially at least about 70% by weight of the coating. Preferred cleaning actives for use herein are bleaches in particular organic bleaches.

Barrier agents perform a protective function. For example they can protect mutually incompatible cleaning actives from one another, cleaning actives or solubility modifiers from the outside environment, the film from the external environment, etc. They can also modify the feeling at touch of the film and/or functional materials. They can make substrates more pleasant to the touch.

Solubility modifiers are substances which modify the solubility of the film and/or functional materials by for example delaying or accelerating its solubility or making solubility dependent of external factors such as pH, temperature, ionic strength, redox potential, etc.

In preferred embodiments the functionalized substrate further comprises an aesthetic agent. The aesthetic agent can have ornamental purposes and can denote the presence of functional materials on the film. It can also signal when a functional material is released or a product "end of life" via a change in colour and/or appearance/disappearance of graphics, patterns, etc.

Highly preferred functional materials herein are cleaning actives, solubility modifiers and combinations thereof, optionally together with barrier agents. Preferably they are present in the coating in a level of at least about 30%, more preferably at least about 50% and especially at least about 70% by weight of the coating.

According to a product aspect of the invention, there is provided a functionalized substrate in the form of a water-soluble film carrying a coating of a functional composition. The functional composition comprises one or more functional material(s). The coating is in a level of at least about 5, preferably at least about 10, more preferably at least about 50 and especially about 100 g/m$^2$ and a loading of at least about 30%, preferably at least about 50%, more preferably at least about 100% and especially at least about 200% by weight of the uncoated film. Preferably, the functionalized substrate is obtainable or obtained according to the process of the invention.

As stated before the functionalized substrates of the invention have a multitude of applications. A preferred application is in the field of cleaning. The functionalized substrate can be cut into or prepared in the form of small pieces, having a maximum linear dimension of from about 0.2 to about 100 mm, preferably from about 0.5 to about 50 mm and more preferably from about 1 to about 20 mm to form part of cleaning products. The pieces can be added to powder, liquid and gel compositions. Functionalized films are a very effective way of protecting sensitive ingredients as well as controlling the delivery of functional materials. In order to provide additional protection, the cutting operation can be registered with the functional material application operation so that no functional material is potentially exposed on the edge of the cut pieces. This is particularly advantageous when the functionalized cut pieces are introduced in a product in liquid/gel form that can potentially react with the functional material exposed on the edge of the cut pieces.

The functionalized substrate is very well suited for use in unit dose cleaning products (such as pouches, capsules and sachets) either as part of the enveloping material or as part of the contents enclosed within the enveloping material. In preferred embodiments the enveloping material is formed at least in part of the functionalized substrate. For example, a single compartment unit dose form typically has separate bottom and top layers of enveloping material, according to this embodiment one or both layers can comprise or be composed of the functionalized substrate of the invention. The same is true for multi-compartment unit dose forms in which top, bottom and/or any of the intermediate layers of enveloping material can comprise or be composed of the functionalized substrate of the invention.

DETAILED DESCRIPTION OF THE INVENTION

The present invention envisages a process for making a functionalized substrate by depositing a functional material(s), preferably by printing, onto a water-soluble film. The invention also envisages a functionalized substrate and cleaning products comprising the substrate of the invention. The process is capable of depositing high loads of functional material(s) using aqueous solutions without impairing on the properties of the water-soluble film.

Process

The functionalized substrate of the invention can be made by depositing a coating of a functional composition using suitable coating means including spraying, knife, rod, kiss, slot, painting, printing and combinations thereof. Printing is preferred for use herein, in particular flexographic (flexo) printing.

In the typical flexo printing sequence, the water-soluble film is fed into the press from a roll. The functional material is printed as the film is pulled through one or more stations, or print units. Each print unit can print the aqueous solution comprising one or more functional materials. Each printing step on a flexo press consists of a series of four rollers or cylinders: fountain roller, meter or anilox roller, flexographic or printing cylinder and impression cylinder.

The first roller (fountain roller) transfers the aqueous solution comprising the functional material(s) from the solution pan to the meter or anilox roller, which is the second roller. A doctor blade may be used if it is necessary to scrape some of the aqueous solution. The anilox roller meters the aqueous solution to a uniform thickness onto the printing cylinder. The substrate then moves between the printing cylinder and the impression cylinder, which is the fourth roller. In some flexographic equipment the fountain roller is missing and the anilox roller functions as both the fountain roller and the meter roller.

The impression cylinder applies pressure to the printing cylinder, thereby transferring the functional material(s) onto the film. The printed film may be fed into an overhead dryer so the newly formed layer is dried to remove most of the residual water before it goes to the next print unit. The finished product is then rewound onto a roll or is fed through the cutter.

The process is suitable for depositing water-soluble materials, water-insoluble materials and mixtures thereof. In the case of water-insoluble materials is preferred to keep the aqueous solution agitated in the solution pan to avoid the settling of the material(s). It is also preferred the use of structurants or thickening agents to promote the suspension of the insoluble materials in water. The coating can comprises a plurality of functional materials by using an aqueous solution comprising more than one functional material or by using aqueous solutions comprising different materials in different printing steps.

The fountain roller does not contact the anilox roller when transferring the aqueous solution to reduce wear. Preferably the fountain roller is made of soft durometer rubber which is silicone coated. The softness permits the fountain roller to pick up the most aqueous solution possible. Fountain rollers are commercially available from Mid American Rubber.

Preferably a doctor blade is used to meter the aqueous solution to a consistent thickness on the surface of the anilox roller. Preferably the doctor blade is a ceramic coated metal blade like the one supplied by BTG, Norcross Ga.

The anilox roller includes a multiplicity of microscopic cells that are arranged in a pattern next to each other and cover the entire surface of the roller. These cells hold the aqueous solution. The cells typically have either a honeycomb shape or a "tri-helical" pattern. The cells can be oriented in rows that run at an angle to the longitudinal axis of the roller (so that the rows of larger sized cells appear to form screw threads around the roller). Typical angles are 30, 45 and 60 degrees. In traditional printing different colours of inks typically are printed with cells that are oriented at different angles.

The coarseness of the anilox roller determines how much of the solution is transferred to the film. As the volume of the anilox cells increases (e.g. from 60 to 100 bcm, standing for billion parts of cube micron), at comparable cell emptying on the plate (transfer), the volume of aqueous solution transferred on the plate and then on the substrate increases.

Anilox rollers are often made of stainless steel. However, for some applications such as the printing of acidic and corrosive materials, (for example, organic perodixes and in particular dibenzoyl peroxide), the rollers should have a ceramic coating to prevent corrosion of the stainless steel roller. Anilox rollers are commercially available from Harper Corporation of America and Interflex.

Flexographic roller is a flexible patterned roll. The flexible plate material can be a 50 durometer, 0.067 inch thick material.

Other plates that can be used for flexographic printing include those identified at column 4, lines 30 to 45 of U.S. Pat. No. 5,458,590.

The water-soluble film can be engraved or embossed such that micro (invisible to the naked eye) or macro (visible) deformations are created in a given pattern before or in conjunction with the deposition of the aqueous solution. This enables larger volumes of functional materials to be deposited, in particular when the functional materials are "sandwiched" between the two laminating films thanks to the void area created by the two engraved or embossed films coming in contact. Relatively large holes can be impressed on both films and the aqueous solution can be applied on both films surface before laminating them together. The level of functional material(s) presents between the two films is much more thanks to the voids created by joining two holes together. Embossing plates that can be used in a flexographic equipment are supplied by Trinity Graphic USA, FL. Another method of holding more functional material on the film is to pre-apply a primer that forms a micro-cellular morphology (small cells) on the film. These primers are micro-cellular coatings based on polyurethane systems that can be applied via coating and printing methods and are supplied by Crompton Corporation, CT. The macro deformations can be achieved by subjecting the film to series of intermeshing ring rolls or engraving flexographic plates. Micro deformations can be either formed by engraving rolls with micro patterns or by, using an hydro formed film that has protruding shapes (e.g. hallow tubes). Protruding hallow shapes can hold additional functional material(s) when in liquid or slurry form thanks to the capillary force.

It is preferred to add a structurant to the aqueous solution, especially if the functional material is insoluble in the aqueous solution because the presence of the structurant helps the suspension of the functional material. Preferred for use herein are polymeric structurants selected from the group consisting of polyacrylates and derivatives thereof; polysaccharides and derivatives thereof; polymer gums and combinations thereof. Polyacrylate-type structurants comprise in particular polyacrylate polymers and copolymers of acrylate and methacrylate. An example of a suitable polyacrylate type structurant is Carbopol Aqua 30 available from B.F. Goodridge Company.

Examples of polymeric gums which may be used as structurant herein can be characterized as marine plant, terrestrial plant, microbial polysaccharides and polysaccharide derivatives. Examples of marine plant gums include agar, alginates, carrageenan and furcellaran.

Examples of terrestrial plant gums include guar gum, gum arable, gum tragacenth, karaya gum, locust bean gum and pectin. Examples of microbial polysaccharides include dextran, gellan gum, rhamsan gum, welan gum and xanthan gum. Examples of polysaccharide derivatives include carboxymethyl cellulose, methyl hydroxypropyl cellulose, hydroxy propyl cellulose, hydroxyethyl cellulose, propylene glycol alginate and hydroxypropyl guar. The second structurant is preferably selected from the above list or a combination thereof. Preferred polymeric gums include pectine, alginate, arabinogalactan (gum Arabic), carrageenan, gellan gum, xanthan gum and guar gum.

If polymeric gum structurant is employed herein, a preferred material of this type is gellan gum.

Gellan gum is a tetrasaccharide repeat unit, containing glucose, glucurronic acid, glucose and rhamrose residues and is prepared by fermentation of Pseudomonaselodea ATCC 31461. Gellan gum is commercially marketed by CP Kelco U.S., Inc. under the KELCOGEL tradename.

Preferably the aqueous solution comprises from about 0.1 to about 20%, more preferably from about 1 to about 10% by weight of the aqueous solution of structurant.

The most preferred structurant for use herein is polyvinyl alcohol (PVA). PVA not only gives the aqueous solution the right viscosity to achieve high loadings but also acts as a binder to layer-up successive layers of the coating making a very strong, flake-free coating. Preferably, the level of PVA in the aqueous solution is from about 0.5 to about 20%, more preferably from about 1 to about 10% and especially from about 2 to about 5% by weight of the aqueous solution.

Water-Soluble Film

The water-soluble film is a film made of polymeric materials and has a water-solubility of at least 50%, preferably at least 75% or even at least 95%, as measured by the method set out here after using a glass-filter with a maximum pore size of 20 microns.

50 grams±0.1 gram of film material is added in a pre-weighed 400 ml beaker and 245 ml±1 ml of distilled water is added. This is stirred vigorously on a magnetic stirrer set at 600 rpm, for 30 minutes. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the % solubility or dispersability can be calculated.

Preferred polymeric materials are those which are formed into a film or sheet. The film can, for example, be obtained by casting, blow-moulding, extrusion or blown extrusion of the polymeric material, as known in the art.

Preferred polymers, copolymers or derivatives thereof suitable for use as film material are selected from polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. More preferred polymers are selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and most preferably selected from polyvinyl alcohols, polyvinyl alcohol copolymers and hydroxypropyl methyl cellulose (HPMC), and combinations thereof. Preferably, the level of polymer in the film, for example a PVA polymer, is at least 60%.

Mixtures of polymers can also be used. This may in particular be beneficial to control the mechanical and/or dissolution properties of the film, depending on the application thereof and the required needs. It may be preferred that a mixture of polymers is used, having different weight average molecular weights, for example a mixture of PVA or a copolymer thereof of a weight average molecular weight of 10,000-40,000, preferably around 20,000, and of PVA or copolymer thereof, with a weight average molecular weight of about 100,000 to 300,000, preferably around 150,000.

Also useful are polymer blend compositions, for example comprising hydrolytically degradable and water-soluble polymer blend such as polylactide and polyvinyl alcohol, achieved by the mixing of polylactide and polyvinyl alcohol, typically comprising 1-35% by weight polylactide and approximately from 65% to 99% by weight polyvinyl alcohol, if the material is to be water-dispersible, or water-soluble. It may be preferred that the PVA present in the film is from 60-98% hydrolysed, preferably 80% to 90%, to improve the dissolution of the material.

Typically the water-soluble film has a basis weight from about 25 g/m$^2$ to about 150 g/m$^2$, preferably from about 50 g/m$^2$ to about 100 g/m$^2$ and a caliper from about 0.025 mm to about 0.160 mm, preferably from about 0.060 mm to about 0.130 mm.

Most preferred water-soluble films are PVA films known under the trade reference Monosol M8630, as sold by Chris-Craft Industrial Products of Gary, Ind., US, and PVA films of corresponding solubility and deformability characteristics. Other films suitable for use herein include films known under the trade reference PT film or the K-series of films supplied by Aicello, or VF-HP film supplied by Kuraray.

The water-soluble film herein may comprise other additive ingredients than the polymer or polymer material and water. For example, it may be beneficial to add plasticisers, for example glycerol, ethylene glycol, diethyleneglycol, propylene glycol, sorbitol and mixtures thereof. Glycerol is the preferred plasticisers. Other useful additives include disintegrating aids.

Film Insolubilizer Agent

Preferred insolubilizer agents for use herein are salts. Salts may include organic or inorganic electrolytes. Suitable salts may include a cation or mixtures of cations selected from the following group: aluminium, ammonium, antimony, barium, bismuth, cadmium, calcium, cesium, copper, iron, lithium, magnesium, nickel, potassium, rubidium, silver, sodium, strontium, zinc and zirconium; and an anion or mixture of anions selected from the following group: acetate, aluminium sulfate, azide, bicarbonate, bisulfite, borohydride, borooxalate, bromate, bromide, carbonate, chloride, chlorite, chromate, cyanate, cyanide, dichromate, disilicate, dithionate, ferricyanide, ferrocyanate, ferrocyanide, fluoride, fluoantimonate, fluoroborate, fluorophosphate, fluorosulfonate, flurosilicate, hydrogen carbonate, hydrogen sulfate, hydrogen sulfite, hydrogencyanide, hydrogenophosphate, hydrogensulfate, hydrosulfite, hydroxide, hydroxostannate, hypochlorite, hyponitrite, hypophosphite, iodate, iodide, manganate, meta-aluminate, metaborate, metaperiodate, metasilicate, mixed halides, molybdate, nitrate, nitrite, orthophosphate, orthophosphite, orthosilicate, oxalate, oxalatoferrate, oxide, perborate, perchlorate, permanganate, peroxide, peroxydisulfate, phosphate, polybromide, polychloride, polyfluoride, polyiodide, polyphosphate, polysulfide, pyrosulfate, pyrosulfite, sesqui-carbonate, silicate, stannate, sulfamate, sulfate, sulfide, sulfite, thiocyanaate or thiosulfate.

Other suitable salts include cations such as substituted ammonium ions R4N (with R=hydrogen or $C_{1-6}$ alkyl, substituted or unsubstituted). Other suitable types of anions include carboxylates, formate, citrate, maleate, tartrate, etc. Suitable salts may comprise $C_{1-9}$ alkyl carboxylic acids; polymeric carboxylates (polyacrylates, polymaleates); short chain ($C_{1-9}$) alkylphosphates, alkylphosphonates; and short chain ($C_{1-9}$) alkyl sulfates and alkylsulphonates.

Preferably the film insolubilizer agent is used in a level of from about 0.5 to about 10%, more preferably from about 1 to about 5% by weight of the aqueous solution. Preferably, the film insolubilising agent is a salt selected from the group consisting of: sodium sulfate, sodium citrate, sodium tripolyphosphate, potassium citrate, and mixtures thereof.

Cleaning Actives

Any traditional cleaning ingredients can be used in the functionalized substrate and/or in the cleaning product of the invention.

Bleach

Inorganic and organic bleaches are suitable cleaning actives for use herein. Inorganic bleaches include perhydrate salts such as perborate, percarbonate, perphosphate, persulfate and persilicate salts. The inorganic perhydrate salts are normally the alkali metal salts. The inorganic perhydrate salt may be included as the crystalline solid without additional protection. Alternatively, the salt can be coated before depositing it onto the water-soluble film.

Alkali metal percarbonates, particularly sodium percarbonate are preferred perhydrates for inclusion in the products of the invention. The percarbonate is most preferably incorporated into the products in a coated form which provides in-product stability. A suitable coating material providing in product stability comprises mixed salt of a water-soluble alkali metal sulphate and carbonate. Such coatings together with coating processes have previously been described in GB-1,466,799. The weight ratio of the mixed salt coating material to percarbonate lies in the range from 1:200 to 1:4, more preferably from 1:99 to 1 9, and most preferably from 1:49 to 1:19. Preferably, the mixed salt is of sodium sulphate and sodium carbonate which has the general formula Na2SO4.n.Na2CO3 wherein n is from 0.1 to 3, preferably n is from 0.3 to 1.0 and most preferably n is from 0.2 to 0.5.

Another suitable coating material providing in product stability, comprises sodium silicate Of SiO2:Na2O ratio from 1.8:1 to 3.0:1, preferably L8:1 to 2.4:1, and/or sodium metasilicate, preferably applied at a level of from 2% to 10%, (normally from 3% to 5%) Of SiO2 by weight of the inorganic perhydrate salt. Magnesium silicate can also be included in the coating. Coatings that contain silicate and borate salts or boric acids or other inorganics are also suitable.

Other coatings which contain waxes, oils, fatty soaps can also be used advantageously within the present invention.

Potassium peroxymonopersulfate is another inorganic perhydrate salt of utility herein.

Typical organic bleaches are organic peroxyacids including diacyl and tetraacylperoxides, especially diperoxydodecanedioc acid, diperoxytetradecanedioc acid, and diperoxyhexadecanedioc acid. Dibenzoyl peroxide is a preferred organic peroxyacid herein. Mono- and diperazelaic acid, mono- and diperbrassylic acid, and Nphthaloylaminoperoxicaproic acid are also suitable herein.

The diacyl peroxide, especially dibenzoyl peroxide, should preferably be present in the form of particles having a weight average diameter of from about 0.1 to about 100 microns, preferably from about 0.5 to about 30 microns, more preferably from about 1 to about 10 microns. Preferably, at least about 25%, more preferably at least about 50%, even more preferably at least about 75%, most preferably at least about 90%, of the particles are smaller than 10 microns, preferably smaller than 6 microns. Diacyl peroxides within the above particle size range have also been found to provide better stain removal especially from plastic dishware, while minimizing undesirable deposition and filming during use in automatic dishwashing machines, than larger diacyl peroxide particles. The preferred diacyl peroxide particle size thus allows the formulator to obtain good stain removal with a low level of diacyl peroxide, which reduces deposition and filming. Conversely, as diacyl peroxide particle size increases, more diacyl peroxide is needed for good stain removal, which increases deposition on surfaces encountered during the dishwashing process.

Further typical organic bleaches include the peroxy acids, particular examples being the alkylperoxy acids and the arylperoxy acids. Preferred representatives are (a) peroxybenzoic acid and its ring-substituted derivatives, such as alkylperoxybenzoic acids, but also peroxy-α-naphthoic acid and magnesium monoperphthalate, (b) the aliphatic or substituted aliphatic peroxy acids, such as peroxylauric acid, peroxystearic acid, ε-phthalimidoperoxycaproic acid[phthaloiminoperoxyhexanoic acid (PAP)], o-carboxybenzamidoperoxycaproic acid, N-nonenylamidoperadipic acid and N-nonenylamidopersuccinates, and (c) aliphatic and araliphatic peroxydicarboxylic acids, such as 1,12-diperoxycarboxylic acid, 1,9-diperoxyazelaic acid, diperoxysebacic acid, diperoxybrassylic acid, the diperoxyphthalic acids, 2-decyldiperoxybutane-1,4-dioic acid, N,N-terephthaloyldi (6-aminopercaproic acid).

Bleach Activators

Bleach activators are typically organic peracid precursors that enhance the bleaching action in the course of cleaning at temperatures of 60° C. and below. Bleach activators suitable for use herein include compounds which, under perhydrolysis conditions, give aliphatic peroxoycarboxylic acids having preferably from 1 to 10 carbon atoms, in particular from 2 to 4 carbon atoms, and/or optionally substituted perbenzoic acid. Suitable substances bear O-acyl and/or N-acyl groups of the number of carbon atoms specified and/or optionally substituted benzoyl groups. Preference is given to polyacylated alkylenediamines, in particular tetraacetylethylenediamine (TAED), acylated triazine derivatives, in particular 1,5-diacetyl-2,4-dioxohexahydro-1,3,5-triazine (DADHT), acylated glycolurils, in particular tetraacetylglycoluril (TAGU), N-acylimides, in particular N-nonanoylsuccinimide (NOSI), acylated phenolsulfonates, in particular n-nonanoyl- or isononanoyloxybenzenesulfonate (n- or iso-NOBS), carboxylic anhydrides, in particular phthalic anhydride, acylated polyhydric alcohols, in particular triacetin, ethylene glycol diacetate and 2,5-diacetoxy-2,5-dihydrofuran and also triethylacetyl citrate (TEAC).

Bleach Catalyst

Bleach catalysts preferred for use herein include the manganese triazacyclononane and related complexes (U.S. Pat. No. 4,246,612, U.S. Pat. No. 5,227,084); Co, Cu, Mn and Fe bispyridylamine and related complexes (U.S. Pat. No. 5,114,611); and pentamine acetate cobalt(III) and related complexes (U.S. Pat. No. 4,810,410). A complete description of bleach catalysts suitable for use herein can be found in WO 99/06521, pages 34, line 26 to page 40, line 16.

Surfactant

Surfactants suitable herein include anionic surfactants such as alkyl sulfates, alkyl ether sulfates, alkyl benzene sulfonates, alkyl glyceryl sulfonates, alkyl and alkenyl sulphonates, alkyl ethoxy carboxylates, N-acyl sarcosinates, N-acyl taurates and alkyl succinates and sulfosuccinates, wherein the alkyl, alkenyl or acyl moiety is $C_5$-$C_{20}$, preferably $C_{10}$-$C_{18}$ linear or branched; cationic surfactants such as chlorine esters (U.S. Pat. No. 4,228,042, U.S. Pat. No. 4,239,660 and U.S. Pat. No. 4,260,529) and mono $C_6$-$C_{16}$ N-alkyl or alkenyl ammonium surfactants wherein the remaining N positions are substituted by methyl, hydroxyethyl or hydroxypropyl groups; low and high cloud point nonionic surfactants and mixtures thereof including nonionic alkoxylated surfactants (especially ethoxylates derived from $C_6$-$C_{18}$ primary alcohols), ethoxylated-propoxylated alcohols (e.g., BASF Poly-Tergent® SLF18), epoxy-capped poly(oxyalkylated) alcohols (e.g., BASF Poly-Tergent® SLF18B—see WO-A-94/22800), ether-capped poly(oxyalkylated) alcohol surfactants, and block polyoxyethylene-polyoxypropylene polymeric compounds such as PLURONIC®, REVERSED PLURONIC®, and TETRONIC® by the BASF-Wyandotte Corp., Wyandotte, Mich.; amphoteric surfactants such as the $C_{12}$-$C_{20}$ alkyl amine oxides (preferred amine oxides for use herein include $C_{12}$ lauryldimethyl amine oxide, $C_{14}$ and $C_{16}$ hexadecyl dimethyl amine oxide), and alkyl amphocarboxylic surfactants such as Miranol™ C2M; and zwitterionic surfactants such as the betaines and sultaines; and mixtures thereof. Surfactants suitable herein are disclosed, for example, in U.S. Pat. No. 3,929,678, U.S. Pat. No. 4,259,217, EP-A-0414 549, WO-A-93/08876 and WO-A-93/08874. Preferred surfactant for use in dishwashing cleaning products are low foaming and include low cloud point nonionic surfactants and mixtures of higher foaming surfactants with low cloud point nonionic surfactants which act as suds suppresser therefor.

Builder

Builders suitable for use in cleaning compositions herein include water-soluble builders such as citrates, carbonates and polyphosphates e.g. sodium tripolyphosphate and sodium tripolyphosphate hexahydrate, potassium tripolyphosphate and mixed sodium and potassium tripolyphosphate salts; and partially water-soluble or insoluble builders such as crystalline layered silicates (EP-A-0164514 and EP-A-0293640) and aluminosilicates inclusive of Zeolites A, B, P, X, HS and MAP.

Amorphous sodium silicates having an $SiO_2$:$Na_2O$ ratio of from 1.8 to 3.0, preferably from 1.8 to 2.4, most preferably 2.0 can also be used herein although highly preferred from the viewpoint of long term storage stability are compositions containing less than about 22%, preferably less than about 15% total (amorphous and crystalline) silicate.

Enzyme

Enzymes suitable herein include bacterial and fungal cellulases such as Carezyme and Celluzyme (Novo Nordisk A/S); peroxidases; lipases such as Amano-P (Amano Pharmaceutical Co.), M1 Lipase$^R$ and Lipomax$^R$ (Gist-Brocades) and Lipolase$^R$ and Lipolase Ultra$^R$ (Novo); cutinases; proteases such as Esperase$^R$, Alcalase$^R$, Durazym$^R$ and Savinase$^R$ (Novo) and Maxatase$^R$, Maxacal$^R$, Properase$^R$ and Maxapem$^R$ (Gist-Brocades); α and β amylases such as Purafect Ox Am$^R$ (Genencor) and Termamyl$^R$, Ban$^R$, Fungamyl$^R$, Duramyl$^R$, and Natalase$^R$ (Novo); pectinases; and mixtures thereof. Enzymes are preferably added herein as prills, granulates, or cogranulates at levels typically in the range from about 0.0001% to about 2% pure enzyme by weight of the cleaning composition.

Low Cloud Point Non-Ionic Surfactants and Suds Suppressers

The suds suppressers suitable for use herein include nonionic surfactants having a low cloud point. "Cloud point", as used herein, is a well known property of nonionic surfactants which is the result of the surfactant becoming less soluble with increasing temperature, the temperature at which the appearance of a second phase is observable is referred to as the "cloud point" (See Kirk Othmer, pp. 360-362). As used herein, a "low cloud point" nonionic surfactant is defined as a nonionic surfactant system ingredient having a cloud point of less than 30° C., preferably less than about 20° C., and even more preferably less than about 10° C., and most preferably less than about 7.5° C. Typical low cloud point nonionic surfactants include nonionic alkoxylated surfactants, especially ethoxylates derived from primary alcohol, and polyoxypropylene/polyoxyethylene/polyoxypropylene (PO/EO/PO) reverse block polymers. Also, such low cloud point nonionic surfactants include, for example, ethoxylated-propoxylated alcohol (e.g., BASF Poly-Tergent® SLF18) and epoxy-capped poly(oxyalkylated) alcohols (e.g., BASF Poly-Tergent® SLF18B series of nonionics, as described, for example, in U.S. Pat. No. 5,576,281).

Preferred low cloud point surfactants are the ether-capped poly(oxyalkylated) suds suppresser having the formula:

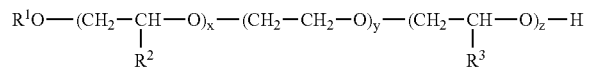

wherein $R^1$ is a linear, alkyl hydrocarbon having an average of from about 7 to about 12 carbon atoms, $R^2$ is a linear, alkyl hydrocarbon of about 1 to about 4 carbon atoms, $R^3$ is a linear, alkyl hydrocarbon of about 1 to about 4 carbon atoms, x is an integer of about 1 to about 6, y is an integer of about 4 to about 15, and z is an integer of about 4 to about 25.

Other low cloud point nonionic surfactants are the ether-capped poly(oxyalkylated) having the formula:

wherein, $R_I$ is selected from the group consisting of linear or branched, saturated or unsaturated, substituted or unsubstituted, aliphatic or aromatic hydrocarbon radicals having from about 7 to about 12 carbon atoms; $R_{II}$ may be the same or different, and is independently selected from the group consisting of branched or linear $C_2$ to $C_7$ alkylene in any given molecule; n is a number from 1 to about 30; and $R_{III}$ is selected from the group consisting of:
(i) a 4 to 8 membered substituted, or unsubstituted heterocyclic ring containing from 1 to 3 hetero atoms; and
(ii) linear or branched, saturated or unsaturated, substituted or unsubstituted, cyclic or acyclic, aliphatic or aromatic hydrocarbon radicals having from about 1 to about 30 carbon atoms;
(b) provided that when $R^2$ is (ii) then either: (A) at least one of $R^1$ is other than $C_2$ to $C_3$ alkylene; or (B) $R^2$ has from 6 to 30 carbon atoms, and with the further proviso that when $R^2$ has from 8 to 18 carbon atoms, R is other than $C_1$ to $C_5$ alkyl.

Other suitable components herein include organic polymers having dispersant, anti-redeposition, soil release or other detergency properties. Preferred anti-redeposition polymers herein include acrylic acid containing polymers such as Sokalan PA30, PA20, PA15, PA10 and Sokalan CP10 (BASF GmbH), Acusol 45N, 480N, 460N (Rohm and Haas), acrylic acid/maleic acid copolymers such as Sokalan CP5 and acrylic/methacrylic copolymers. Preferred soil release polymers herein include alkyl and hydroxyalkyl celluloses (U.S. Pat. No. 4,000,093), polyoxyethylenes, polyoxypropylenes and copolymers thereof, and nonionic and anionic polymers based on terephthalate esters of ethylene glycol, propylene glycol and mixtures thereof.

Heavy metal sequestrants and crystal growth inhibitors are also suitable for use herein, for example diethylenetriamine penta (methylene phosphonate), ethylenediamine tetra(methylene phosphonate) hexamethylenediamine tetra(methylene phosphonate), ethylene diphosphonate, hydroxy-ethylene-1,1-diphosphonate, nitrilotriacetate, ethylenediaminotetracetate, ethylenediamine-N,N'-disuccinate in their salt and free acid forms.

The substrates and cleaning compositions herein can contain a corrosion inhibitor such as organic silver coating agents (especially paraffins such as Winog 70 sold by Wintershall, Salzbergen, Germany), nitrogen-containing corrosion inhibitor compounds (for example benzotriazole and benzimadazole—see GB-A-1137741) and Mn(II) compounds, particularly Mn(II) salts of organic ligands.

Other suitable components herein include enzyme stabilizers such as calcium ion, boric acid, propylene glycol and chlorine bleach scavengers, lime soap dispersants (see WO-A-93/08877), suds suppressors (see WO-93/08876 and EP-A-0705324), polymeric dye transfer inhibiting agents, optical brighteners, perfumes, fillers and clay.

The cleaning product of the invention can be in the form of powder, liquid or gel or in unit dose form including tablets and in particular pouches, capsules and sachets.

Solubility Modifiers

Solubility modifiers modify the solubility of the water-soluble film, by for example favouring or precluding solubility below or above of a certain temperature, pH, ionic strength, pKa, redox potential, enzymatic concentration, etc. The solubility modifiers also help to achieve controlled release of the functional materials from the functionalized substrate.

A suitable solubility modifier is an amino-acetylated polysaccharide, preferably chitosan, having a selected degree of acetylation. The solubility of chitosan is pH dependent and the dissolution of the functionalized substrate can be restricted to a determined pH by making use of this property.

Other suitable solubility modifiers include the polymer described in WO 03/68852 which water solubility may be triggered by changes in pH, salt concentration, concentration of surfactant or a combination of both. The polymer is a copolymer or terpolymer containing from 2 to 60 mole percent of a protonated amine functionality which has been neutralized with a fixed acid. WO 02/26928 also describes suitable composite polymers that can be used for controlled release purposes, especially in dishwashing and laundry.

Additional suitable solubility modifiers that are soluble in a given pH range are based on methacrylic acid co-polymers, styrene hydroxystyrene co-polymers, acrylate co-polymers, polyethylene glycol polyvinyl acetate, diethylphtalate, dioctyl sodium sulfocuccinate, poly-dl-lactide-co-glycolide (PLG), vinylpyridine/styrene co-polymers, chitosan/lactic acid, chitosan/polyvyl acohol, commercially available from Degussa Rhom Pharma under the trade name Eudragit, from Eastman under the trade name Eastacryl, from MacroMed Inc. under the trade name SQZgel.

Solubility modifiers that are soluble in a specific chemistry environment are also commercially available. For instance caustic soluble barrier agents are commercially available from Alcoa under the trade name Hydra-Coat-5. Water dispersible barrier agent are based on Sodium starch glycolate, polyplasdone and are commercially available from FMC Corporation under the trade name Ac-di-sol, from Edward Mendell Corporation under the trade name Explotab, from ISP under the trade name Crospovidone.

Barrier Agents

Barrier agents can help to improve storage stability, in particular in a high-humidity environment and/or the feel to the touch. Suitable barrier agents include zeolite, bentonite, talc, mica, kaolin, silica, silicone, starch and cyclodextrin. Polymers, especially cellulosic materials are also suitable as barrier agent.

Other suitable barrier agents include varnish, shellac, lacquer, polyolefins, paraffins, waxes, polyacrylates, polyurethanes, polyvinyl alcohol, polyvinyl acetate, or combinations thereof. One non-limiting example of a suitable water-soluble barrier agent is an OPV (Over Print Varnish) commercially available from Sun Chemical Corporation of Charlotte, N.C. and sold as TV96-6963 water flexo film varnish.

UV absorbers may be used to protect ingredients that degrade with light. Preferred families of UV absorbers which may be used are benzophenones, salicyclates, benzotriazoles, hindered amines and alkoxy (e.g., methoxy) cinnamates and mixtures thereof. Water-soluble UV absorbers particularly useful for this application include: phenyl benzimidazole sulfonic acid (sold as Neo Heliopan, Type Hydro by Haarmann and Reimer Corp.), 2-hydroxy-4-methoxybenzophenone-5-sulfonic acid (sold as Syntase 230 by Rhone-Poulenc and Uvinul MS-40 by BASF Corp.), sodium 2,2'-dihydroxy-4,4'-dimethoxy-5-sulfobenzophenone (sold as Uvinul DS-49 by BASF Corp.), and PEG-25 paraaminobenzoic acid (sold as Uvinul P-25 by Basf Corp.). Other UV absorbers which may be used are defined in McCutcheon's Volume 2, Functional Materials, North American Edition, published by the Manufacturing Confectioner Publishing Company (1997).

According to EP 1,141,207 fluorescent dyes can also act as light protecting agents. Preferred classes of fluorescent dyes which may be used include stilbenes; coumarin and carbostyril compounds; 1,3-diphenyl-2-pyrazolines; naphthalimides; benzadyl substitution products of ethylene, phenylethylene, stilbene, thiophene; and combined heteroaromatics and mixtures thereof. Especially preferred fluorescent dyes which may be used are also the sulfonic acid salts of diamino stilbene derivatives such as taught in U.S. Pat. No. 2,784,220 and U.S. Pat. No. 2,612,510. Polymeric fluorescent whitening agent as taught in U.S. Pat. No. 5,082,578 are also suitable for use herein. Other dyes which may be used are defined in McCutcheon's Volume 2, Functional Materials, North American Edition as noted above in connection with UV absorbers.

Fluorescent dyes particularly useful for this application include: the distyrylbiphenyl types such as Tinopal CBS-X from Ciba Geigy Corp. and the cyanuric chloride/diaminostilbene types such as Tinopal AMS, DMS, 5BM, and UNPA from Ciba Geigy Corp. and Blankophor DML from Mobay.

Functionalized Substrate

As discussed before the substrates of the invention have a great number of applications. Edible films can be coated with vitamin, minerals, flavours, edible dyes, etc. A preferred execution is a plurality of films each of them of a different colour and coated with a different flavour and the plurality of films are sealed together to give the user the experience of having a range of flavours by the dissolution of different films. Other examples are flavours, coffee creamer, sweetener, sugar printed on an edible soluble film that is conveniently used to package soluble instant coffee single servings.

Another preferred execution is the addition of functionalized substrate cut pieces into toothpastes products. Anti-bacterial, breath odour control, bleaching, etc. functional materials can be incorporated and also provide, if desired, pleasant aesthetics (functionalized substrates cut pieces can be coloured, fluorescent, sparkle, etc.) and be released upon toothpaste use and dissolution.

The substrates of the invention also have a great number of applications in cleaning products. They can be incorporated in conventional substrates such as wipers to deliver functional materials once the wiper interacts with water. They also have applications on personal care. They can be incorporated in diapers, face and body wipers, etc. Especially suitable in the personal care field are substrates having moisturisers as functional materials.

In hard-surface, dishwashing and laundry products the functionalized substrates can separate functional materials from one another as well as control the release of the functional materials. The functionalized substrates can comprise more than one functional material in a layer or a plurality of layers comprising a plurality of functional materials or discrete regions comprising different functional materials. Alternatively two or more functional substrates can be stacked together to provide a plurality of functional materials. Preferred executions include functionalized substrates wherein the functional material is a solid having a small particle size (i.e. particles having a weight average diameter less than about 200 µm, preferably less than 100 µm and even more preferably less than 50 µm), as can be the case of particulate bleach or bleach catalyst. Sometimes the use of small particle size materials is preferred in order to decrease dissolution time and/or increase the activity of the material. Small size particle materials can be difficult to process giving rise to segregation in the case of powder compositions or dusting during handling. These problems are overcome by making a coating, by for example printing, of the small particle size material onto a water-soluble film. The coating can be protected by adding an additional water-soluble film thereby having the small particle size materials in a "sandwich" structure. Alternatively, the coating can be protected by means of a barrier agent.

Another preferred execution involves coating the film with two or more materials that act as the same time, such as bleach and bleach activator. The two materials are preferably placed in separate discrete regions of the film in order to avoid interaction during storage. Each material can be coloured with a dye or pigment to indicate to the user the presence of different materials.

The functionalized substrates of the invention are particularly suitable to separate incompatible materials, for example a film can be coated with bleach and a second film coated with enzyme can be superposed to the first film, avoiding the interaction between bleach and enzymes. The enzyme can be release first into an aqueous environment. Additionally the coating comprising the bleach can comprise a solubility modifier in order to delay the release of the bleach, thereby allowing the enzyme to perform enzymatic activity under optimum conditions, i.e., in the absence of bleach. On the other hand, the bleach will act on a substrate where some of the soil has been released by the enzymes and the bleach will be used on treating the remaining stains.

The functionalized substrates can be coloured with scent and/or flavour associated to them, ie., pink film with strawberry scent/flavour, orange film with mandarin scent/flavour, etc.

Cleaning Product in Unit Dose Form

In a preferred embodiment of the present invention the composition is in the form of a unit dose cleaning product. It could be single or multi-compartment unit dose product, preferably a vacuum- or thermoformed multi-compartment water-soluble pouch, wherein one of the compartments, preferably contains a solid powder composition. Preferred manufacturing methods for unit dose executions are described in WO 02/42408.

Single compartment pouches can be made by placing a first piece of film in a mould, drawing the film by vacuum means to form a pocket, filling the formed pocket with a detergent or bleach including the guest-host complex, and placing and sealing the formed pocket with another piece of film.

Multi-compartment pouches comprising a powder and a liquid composition can be made by placing a first piece of film in a mould, drawing the film by vacuum means to form a pocket, pinpricking the film, dosing and tamping the powder composition, placing a second piece of film over the first pocket to form a new pocket, filling the new pocket with the liquid composition, placing a piece of film over this liquid filled pocket and sealing the three films together to form the dual compartment pouch.

EXAMPLES

Abbreviations used in Examples

In the examples, the abbreviated component identifications have the following meanings:

| | |
|---|---|
| Carbonate | Anhydrous sodium carbonate |
| STPP | Anhydrous sodium tripolyphosphate |
| Silicate | Amorphous Sodium Silicate ($SiO_2$:$Na_2O$ = from 2:1 to 4:1) |
| Percarbonate | Sodium percarbonate of the nominal formula $2Na_2CO_3.3H_2O_2$ |
| Amylase | α-amylase available from Novo Nordisk A/S |
| Protease | protease available from Genencor |
| SLF18 | Poly-Tergent ® available from BASF |
| Alcosperse 240 | sulfonated polymer available from Alco Chemical |

Example 1

An aqueous solution comprising 42% of benzoyl peroxide (Oxycare 42, supplied by ABCO Industries), was printed on a M8630™ 3.0 mil (100 grams per square mater basis weight) water-soluble PVA film supplied by Monosol LLC of Gary, Ind. The solution was printed on the film via a narrow web Comco flexographic printing press (commercially available from Mark Andy of Milford, Ohio), measuring 28 cm in width, having 6 stations and capable of hot air drying. Ceramic coated anilox rolls were used (supplied by Harper Corp). Fountain rolls (that pick up the aqueous solution from the pan and transfer it to the anilox roll) are supplied by Mid American Rubber, Three Rivers, Mich. Photopolymer printing plates are supplied by Du Pont (Cyrel brand). The printing took place on three of the six stations. The three sequential stations used respectively a 60 lpi (lines per inch)/40 bcm (billion cubic micron), 30 lpi/100 bcm and 30 lpi/100 bcm anilox rolls and it was allowed to dry in between the stations via convected hot air blown over the printed film surface to remove the water. The coating is in a level of 85 g/m$^2$ and the loading is 85% by weight of the uncoated film.

Example 2

A printing process as that described in example 1 is used but after the third printing station the drying step is eliminated and a second M8630™ film is placed over the wet printed film to create a laminate.

Example 3

Graphics are printed in a laminate obtained according to Example 2 using a white ink (Aqua HSX05700 manufactured by Environmental Inks and Coatings, Morgaton, N.C.).

Example 4

Graphics which change colour with temperature are printed in a laminate obtained according to Example 2 using a thermo chromic ink: Dynacolor commercially available from CTI, Colorado Springs, Colo.

Example 5

The laminate resulting from example 2 is cut in 2.6×2.6 mm and 2×10 mm pieces and added to a dishwashing detergent composition in powder form.

| Powder composition | |
|---|---|
| STPP | 35 |
| Silicate | 4 |
| Carbonate | 26 |
| Amylase | 1 |
| Protease | 2 |
| Percarbonate | 20 |
| SLF18 | 1.5 |
| Perfume | 0.2 |
| Alcosperse 240 | 3 |
| Mis/moisture to balance | |

Example 6

A printing method as described in example 1 is used but a 1.5 mil (50 grams per square meter basis weight) water-soluble film supplied by Monosol LLC of Gary, Ind. is used instead and the aqueous solution contains 2.5% of PVA by weight of the solution. Two printing stations are used, employing respectively a 60 lpi/40 bcm and 30 lpi/100 bcm anilox rolls. The final concentration of benzoyl peroxide is 63 grams per square meter and 126% of the soluble film weight.

Example 7

A printing method as described in example 1 is used but a 2.0 mil (67 grams per square meter basis weight) water-soluble film supplied by Monosol LLC of Gary, Ind. is used instead. Four printing stations are used, employing respectively a 60 lpi/40 bcm, 30 lpi/100 bcm, 30 lpi/100 bcm and 30 lpi/100 bcm anilox rolls. The final concentration of benzoyl peroxide is 70 grams per square meter and 104% of the soluble film weight.

Example 8

A printing method as described in example 7 is used but a flexo OPV (Over Print Varnish) water-soluble material sold as TV96-6963 supplied by Sun Chemical Corporation of Charlotte, N.C. is printed in the fourth printing station instead to protect the benzoyl peroxide from external moisture. The final concentration of benzoyl peroxide is 50 grams per square meter and 75% of the soluble film weight.

Example 9

The method described in example 6 is repeated but in this occasion the aqueous solution comprises 4% by weight of the solution of sodium sulphate. Only two printing stations are used, employing respectively a 60 lpi/40 bcm and a 30 lpi/100 bcm anilox rolls. The final concentration of benzoyl peroxide is 50 grams per square meter and 100% of the soluble film weight.

Example 10

Like example 6 but using a 2 mil PVA film and an aqueous solution comprising 40% of C12-DAP (di-lauroyl peroxide) supplied by Degussa under the trade name of LP-40-SAQ. The final concentration of di-lauroyl peroxide is 48 grams per square meter and 72% of the soluble film weight.

Example 11

An aqueous solution comprising 50% of coffee solids by weight of the solution is printed on 1.5 mil PVA film, using the printing equipment of example 1. Two printing stations are used, employing respectively a 60 lpi/40 bcm and 30 lpi/100 bcm anilox rolls. The final concentration of coffee is 18 grams per square meter and 36% of the soluble film weight.

All documents cited in the Detailed Description of the Invention are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for making a functionalized substrate for use in cleaning products in the form of a water-soluble film carrying a coating of a functional composition, the process comprising applying to at least one side of the film an aqueous solution comprising one or more functional materials to form the coating wherein the coating is formed from a plurality of layers in a stepwise manner, wherein the stepwise process allows partial or total drying to take place before the next layer is deposited, wherein each layer comprises different functional materials, the one or more functional materials is/are selected from the group consisting of cleaning actives, barrier agents, solubility modifiers and mixtures thereof, and the aqueous solution further comprises a film insolubilizer agent.

2. A process according to claim 1 wherein the coating is in a level of at least 5 g/m$^2$ and a loading of at least 30% by weight of the uncoated film.

3. A process according to claim 1 comprising depositing a second film over the coating and sealing the two films together to form a laminate.

4. A process according to claim 1 wherein the functionalized substrate further comprises an aesthetic agent.

5. A process according to claim 1 wherein the coating is formed by printing.

6. A process according to claim 5 wherein the printing is flexography printing.

* * * * *